US012565115B2

(12) United States Patent
Choi et al.

(10) Patent No.: US 12,565,115 B2
(45) Date of Patent: Mar. 3, 2026

(54) SYSTEM AND METHOD FOR CONTROLLING BATTERY TEMPERATURE FOR VEHICLE-TO-VEHICLE CHARGING

(71) Applicants:Hyundai Motor Company, Seoul (KR); Kia Corporation, Seoul (KR)

(72) Inventors: Jae-Hyuk Choi, Seoul (KR); Hyun-Soo Park, Seoul (KR); Kyoung-Joo Kim, Daejeon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 711 days.

(21) Appl. No.: 18/068,582

(22) Filed: Dec. 20, 2022

(65) Prior Publication Data

US 2024/0010094 A1     Jan. 11, 2024

(30) Foreign Application Priority Data

Jul. 5, 2022    (KR) ......................... 10-2022-0082405

(51) Int. Cl.
| | |
|---|---|
| *H02J 7/00* | (2006.01) |
| *B60L 53/57* | (2019.01) |
| *B60L 53/66* | (2019.01) |
| *B60L 58/24* | (2019.01) |
| *H02J 7/14* | (2006.01) |
| *H02J 7/34* | (2006.01) |

(52) U.S. Cl.
CPC .............. *B60L 53/66* (2019.02); *B60L 53/57* (2019.02); *B60L 58/24* (2019.02); *H02J 7/0048* (2020.01); *H02J 7/342* (2020.01)

(58) Field of Classification Search
CPC   B60L 53/57; B60L 53/66; B60L 58/24; H02J 7/0048; H02J 7/342
USPC ......................................... 320/134
See application file for complete search history.

(56) References Cited

U.S. PATENT DOCUMENTS

| | | | |
|---|---|---|---|
| 11,235,675 B2 | 2/2022 | Choi et al. | |
| 2003/0218953 A1* | 11/2003 | Park ................... | G11B 20/1403 |

(Continued)

FOREIGN PATENT DOCUMENTS

| | | |
|---|---|---|
| KR | 20150097978 A | 8/2015 |
| KR | 20200139077 A | 12/2020 |
| KR | 20210007718 A | 1/2021 |

*Primary Examiner* — Alexis B Pacheco
(74) *Attorney, Agent, or Firm* — Slater Matsil, LLP

(57) ABSTRACT

An embodiment system for controlling a battery temperature for vehicle-to-vehicle charging includes an info controller provided in a power receiving electric vehicle and configured to receive information on a power transmitting electric vehicle and charging schedule information from a vehicle-to-vehicle charging service server, a vehicle controller configured to receive the information on the power transmitting electric vehicle and the charging schedule information from the info controller, to receive battery temperature information of the power receiving electric vehicle from a battery controller, and to calculate an estimated charging time of vehicle-to-vehicle charging by the power transmitting electric vehicle, and a battery temperature controller configured to control the battery temperature of the power receiving electric vehicle by controlling operation of a battery heater or a battery chiller, wherein the vehicle controller is configured to control the battery temperature controller in consideration of the estimated charging time.

20 Claims, 5 Drawing Sheets

(56)                    References Cited

U.S. PATENT DOCUMENTS

| 2011/0309786 | A1* | 12/2011 | Hassan | ................ | F03D 3/0427 |
| | | | | | 290/55 |
| 2021/0008994 | A1 | 1/2021 | Choi et al. | | |
| 2021/0152010 | A1* | 5/2021 | Nagai | .................... | B60L 58/12 |
| 2022/0014035 | A1* | 1/2022 | Janek | ................ | H01M 10/6556 |
| 2022/0120815 | A1* | 4/2022 | Wei | ................... | G01R 31/3648 |
| 2023/0062270 | A1* | 3/2023 | Li | ........................ | H01M 10/48 |

* cited by examiner

1

SYSTEM AND METHOD FOR CONTROLLING BATTERY TEMPERATURE FOR VEHICLE-TO-VEHICLE CHARGING

CROSS-REFERENCE TO RELATED APPLICATIONS

This application claims the benefit of Korean Patent Application No. 10-2022-0082405, filed on Jul. 5, 2022, which application is hereby incorporated herein by reference.

TECHNICAL FIELD

Exemplary embodiments of the present disclosure relate to a system and method for a battery temperature for vehicle-to-vehicle charging.

BACKGROUND

The conventional mobile charging methods for electric vehicles are methods for charging with a separate mobile fast charger for fast charging. Such a technology has the advantage of being able to charge fast, but needs to be mounted on a separate power supply device for fast charging, and thus, there are disadvantages of increasing a weight, a volume, and a cost.

As related art technologies for solving these limitations, there are Korean Patent Publication No. 10-2019-0133396 and Korean Patent Publication No. 10-2019-0084631.

The above related art enables fast charging and has the advantage of charging with only a dedicated cable for fast charging of vehicle-to-vehicle by utilizing an internal power supply of an electric vehicle (EV) without a separate fast charger.

A vehicle-to-vehicle (V2V) charging service provides a power charging service to vehicles which require fast charging using the above technology.

That is, when a battery of a power receiving electric vehicle of a customer is discharged and when fast charging is requested to a vehicle-to-vehicle charging service server, a V2V charging vehicle linked to the vehicle-to-vehicle charging service server moves to the requested vehicle to service vehicle-to-vehicle charging.

However, even when such a system has developed for fast charging, there is a limitation in which a charging speed is limited according to a battery temperature condition of the power receiving electric vehicle.

That is, a charging speed is not fast and is limited due to sub-zero weather in winter. Accordingly, power charging providers which operate a charging service cannot optimally operate charging services, and customers have a disadvantage of not receiving optimal fast charging.

The matters described in the background technology are intended to help understand the background of embodiments of the disclosure and may include matters other than those of the related art known to those skilled in the art.

SUMMARY

Exemplary embodiments of the present disclosure relate to a system and method for a battery temperature for vehicle-to-vehicle charging. Particular embodiments relate to a system and method which control a battery temperature for vehicle-to-vehicle charging.

Embodiments of the present disclosure can solve problems in the art, and an embodiment of the present disclosure provides a system and method for controlling a battery temperature for vehicle-to-vehicle charging, which are capable of solving charging speed and charging operation problems according to an existing battery temperature.

A system for controlling a battery temperature for vehicle-to-vehicle charging according to an embodiment of the present disclosure includes an info controller which is provided inside a power receiving electric vehicle and receives information on a power transmitting electric vehicle and charging schedule information from a vehicle-to-vehicle charging service server and transmits the information to a vehicle controller, the vehicle controller which receives battery temperature information of the power receiving electric vehicle from a battery controller and calculates an estimated charging time of vehicle-to-vehicle charging by the power transmitting electric vehicle, and a battery temperature controller which controls a battery temperature of the power receiving electric vehicle by controlling operation of a battery heater or a battery chiller, wherein the vehicle controller controls the battery temperature controller in consideration of the estimated charging time.

As an exemplary embodiment, the information on the power transmitting electric vehicle and the charging schedule information may include a charging start time by the power transmitting electric vehicle and maximum charging output information of the power transmitting electric vehicle.

As an exemplary embodiment, the vehicle controller may calculate the estimated charging time in consideration of a current state of charge (SoC) of the power receiving electric vehicle.

As an exemplary embodiment, the vehicle controller may control the battery temperature controller by comparing the estimated charging time and a charge lead time, which is a difference between a charging completion target time requested to the vehicle-to-vehicle charging service server and the charging start time.

As an exemplary embodiment, the vehicle controller may control the battery heater to be operated by a battery controller when the estimated charging time exceeds the charge lead time.

As an exemplary embodiment, the vehicle controller may calculate a required heating temperature for increasing the battery temperature of the power receiving electric vehicle and may calculate a heating time taken to reach the required heating temperature when the estimated charging time exceeds the charge lead time. Further, the required heating temperature is greater than or equal to a difference between a battery temperature at which the estimated charging time and the charge lead time are the same and a current battery temperature.

As an exemplary embodiment, the vehicle controller may calculate a time, as the heating start time, prior to the heating time from an arrival time of the power transmitting electric vehicle included in the information on the power transmitting electric vehicle. Further, the battery controller may control the battery heater to be operated when the heating start time arrives.

As an exemplary embodiment, a method of controlling a battery temperature for vehicle-to-vehicle charging according to an embodiment of the present disclosure includes receiving, by an info controller provided inside a power receiving electric vehicle, information on a power transmitting electric vehicle and charging schedule information from a vehicle-to-vehicle charging service server, calculating, by a vehicle controller, a charge lead time of the power receiving electric vehicle after the receiving of the information on the power transmitting electric vehicle and the charging schedule information from the info controller, calculating, by the vehicle controller, an estimated charging time after receiving a current battery temperature of the power receiving electric vehicle from a battery controller, and comparing, by the vehicle controller, the charge lead time and the estimated charging time. Further, the battery temperature of the power receiving electric vehicle is controlled by heating when the charge lead time is shorter than or equal to the estimated charging time.

As an exemplary embodiment, the method of controlling a battery temperature for vehicle-to-vehicle charging may further include calculating a required heating temperature for increasing the battery temperature of the power receiving electric vehicle when the charge lead time is shorter than or equal to the estimated charging time and calculating a heating time taken to reach the required heating temperature.

As an exemplary embodiment, the required heating temperature may be greater than or equal to a difference between a battery temperature at which the estimated charging time and the charge lead time are the same and a current battery temperature.

As an exemplary embodiment, the charge lead time may be calculated using a difference between an arrival time of the power transmitting electric vehicle and a target time of charging completion requested to the vehicle-to-vehicle charging service server on the basis of a maximum charging output of the power transmitting electric vehicle included in the information on the power transmitting electric vehicle.

As an exemplary embodiment, the method may further include calculating a heating start time after the calculating of the heating time. Further, the heating start time is calculated using a time prior to the heating time from an arrival time of the power transmitting electric vehicle included in the information on the power transmitting electric vehicle.

As an exemplary embodiment, the battery temperature of the power receiving electric vehicle is controlled by heating when the heating start time arrives after the calculating of the heating start time.

According to a system and method for controlling a battery temperature for vehicle-to-vehicle charging in accordance with embodiments of the present disclosure, there are the following advantages.

Embodiments of the present disclosure provide a method of optimizing a charging speed through battery temperature control, which can increase a charging operation rotation rate for a provider which operates a power charging service.

Embodiments of the present disclosure provide an optimal charging speed for a power charging customer by solving the problem of reduction in a charging speed due to an existing battery temperature condition.

Embodiments of the present disclosure provide another type of charging infrastructure by solving the problem of decreasing charging power and performing fast charging constantly.

Embodiments of the present disclosure contribute to the expansion of the electric vehicle market by increasing the convenience of fast charging of electric vehicle users and removing obstacles (charging convenience) of existing electric vehicle purchases.

DETAILED DESCRIPTION OF ILLUSTRATIVE EMBODIMENTS

The accompanying drawings illustrating exemplary embodiments of the present disclosure and the contents described in the accompanying drawings should be referenced in order to fully understand the operational advantages of embodiments of the present disclosure and the features achieved by embodiments of the present disclosure.

In describing an exemplary embodiment of the present disclosure, a well-known technique or repeated description that may unnecessarily obscure the gist of the present disclosure will be reduced or omitted.

Figure 1:
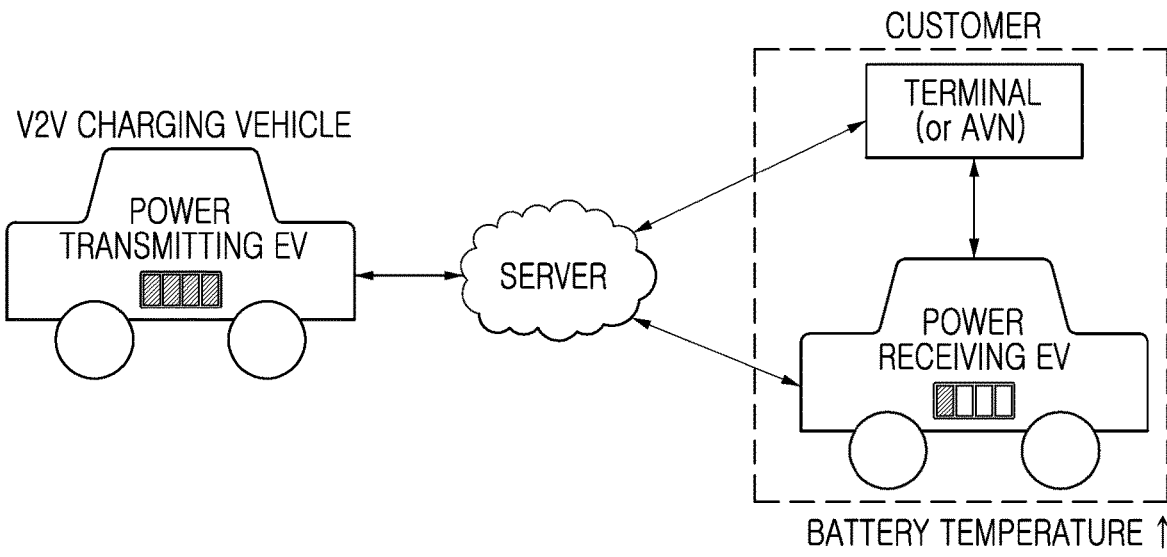
FIG. 1 is a schematic diagram of a vehicle-to-vehicle charging service, to which embodiments of the present disclosure are applied.
Figure 2:
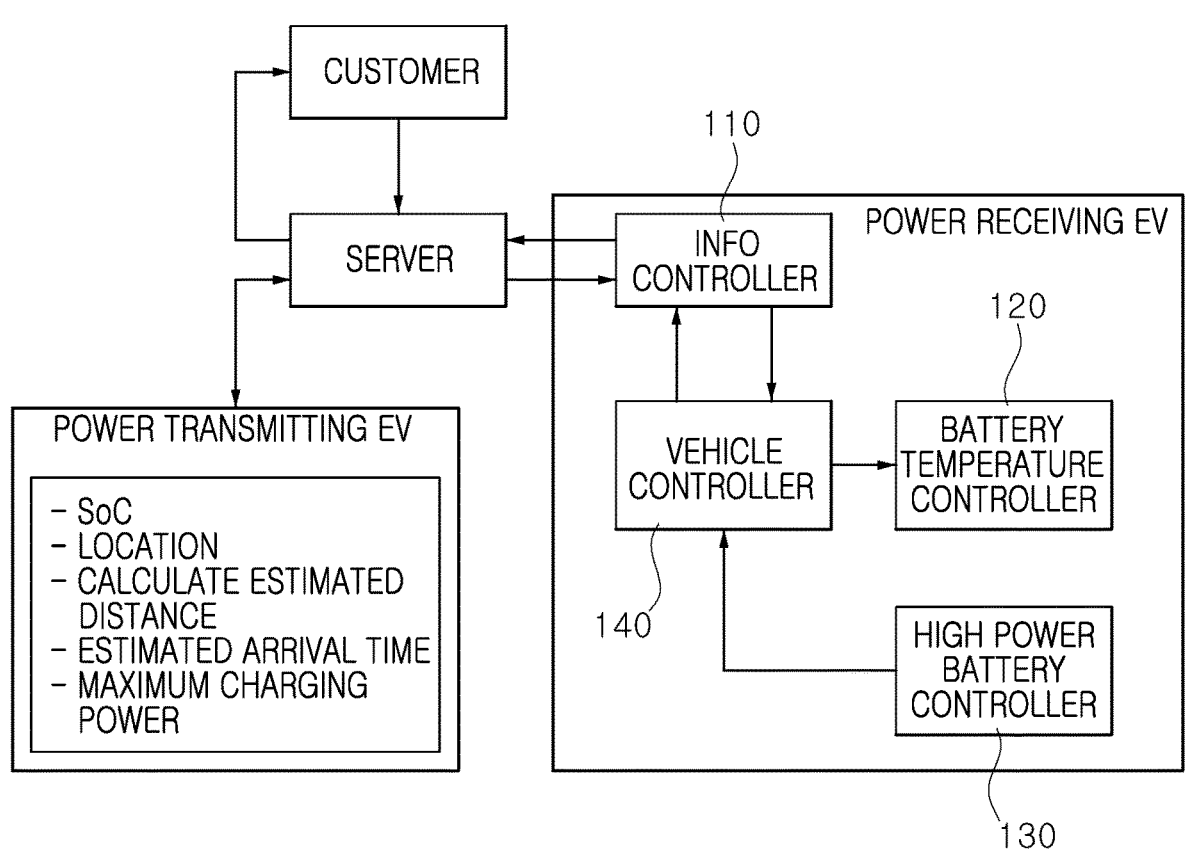
FIG. 2 illustrates a system and service system for controlling a battery temperature for vehicle-to-vehicle charging according to embodiments of the present disclosure.
Figure 3:
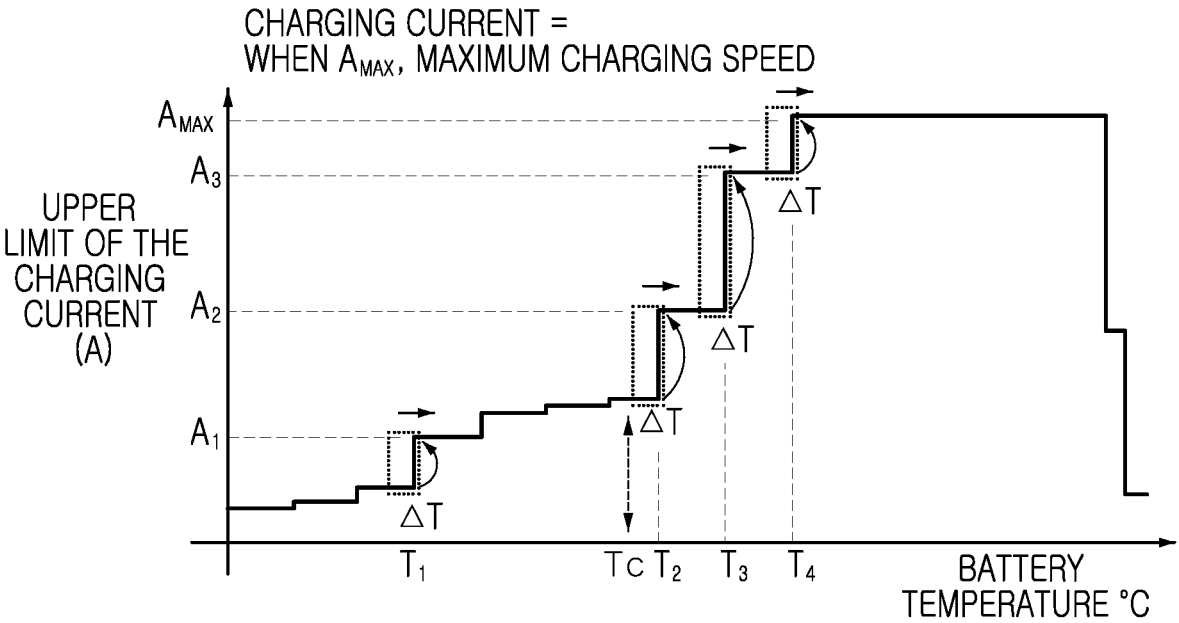
FIG. 3 illustrates an upper limit of a charging current according to a battery temperature.

FIG. 1 is a schematic diagram of a vehicle-to-vehicle charging service, to which embodiments of the present disclosure are applied, and FIG. 2 illustrates a system and service system for controlling a battery temperature for vehicle-to-vehicle charging according to embodiments of the present disclosure. FIG. 3 illustrates an upper limit of a charging current according to a battery temperature.

Hereinafter, referring to FIGS. 1 to 3, the system for controlling a battery temperature for vehicle-to-vehicle charging according to an embodiment of the present disclosure will be described.

The system for controlling a battery temperature for vehicle-to-vehicle charging according to embodiments of the present disclosure is applied to a power receiving electric vehicle (power receiving EV) of a customer to use a vehicle-to-vehicle charging service.

The vehicle-to-vehicle charging service is provided by a service server as illustrated, and a power transmitting electric vehicle (power transmitting EV) of the charging service provider moves to a location of a power receiving electric vehicle according to a request from a customer's terminal, and then performs vehicle-to-vehicle fast charging.

Embodiments of the present disclosure can solve a limitation of a charging speed according to a battery temperature condition of a power receiving electric vehicle.

For example, when a battery temperature of the power receiving electric vehicle is low, even when the power transmitting electric vehicle may supply a power of 100 kW, charging may be performed at a speed of 30 kW. On the other hand, charging may be performed at a speed of 100 kW when a battery temperature of the power receiving electric vehicle is high.

For solving this problem, a battery temperature of the power receiving electric vehicle is controlled by the system as shown in FIG. 2, thereby enabling more efficient service use.

The system for controlling a battery temperature for vehicle-to-vehicle charging of embodiments of the present disclosure includes an information (info) controller no, a battery temperature controller 120, a battery controller 130, and a vehicle controller 140.

When a request for a charging service including a charging completion request time is input from a customer's terminal to a service server using an application (app), a website, an audio/video/navigation (AVN) system, or the like, the service server determines the requested charging service using information about a state of charge (SoC), a location, an estimated distance, an estimated arrival time, and a maximum charging output of the power transmitting electric vehicle, and transmits information on the power receiving electric vehicle and charging schedule information to the power receiving electric vehicle.

The information on the power transmitting electric vehicle and the charging schedule information are received by the info controller no of the power receiving electric vehicle, and the info controller no transmits a charging control request including the information on the power transmitting electric vehicle and a charging completion target time to the vehicle controller 140.

The information on the power transmitting electric vehicle includes information about a state of charge (SoC), a location, a distance, and an estimated arrival time of the power transmitting electric vehicle.

The vehicle controller 140 receives battery temperature information through the battery controller 130 and then calculates an estimated charging time.

The vehicle controller 140 controls the battery temperature controller 120 in consideration of the calculated estimated charging time, a charging start time, and a charging completion target time.

That is, considering the estimated charging time, the charging start time, and the charging completion target time, when the estimated charging time exceeds a charge lead time at the current battery temperature, the estimated charging time may be shortened by controlling the battery temperature to be high.

The battery temperature controller 120 controls operation start of a battery heater or a battery chiller according to a control of the vehicle controller 140.

Then, after the charging is completed by vehicle-to-vehicle charging, the vehicle controller 140 transmits charging completion information to the info controller no, and the info controller no transmits the charging completion information to the service server and terminates the service.

Referring to FIG. 3, an upper limit of the charging current is set according to a battery temperature, and embodiments of the present disclosure may control the battery temperature using the set upper limit.

That is, the charging speed is limited according to the battery temperature, and a charging speed may be increased when a temperature is increased by the battery heater.

As battery energy is consumed when a battery heater operates, it is possible to set a temperature range in which a charging speed increases even with a minimum temperature rise ($\Delta T$) according to a control strategy (a great effect is obtained compared to minimum energy consumption).

As illustrated in the drawing, when a current battery temperature Tc is increased by $\Delta T$, an upper limit of battery charging current is changed.

Figure 4:
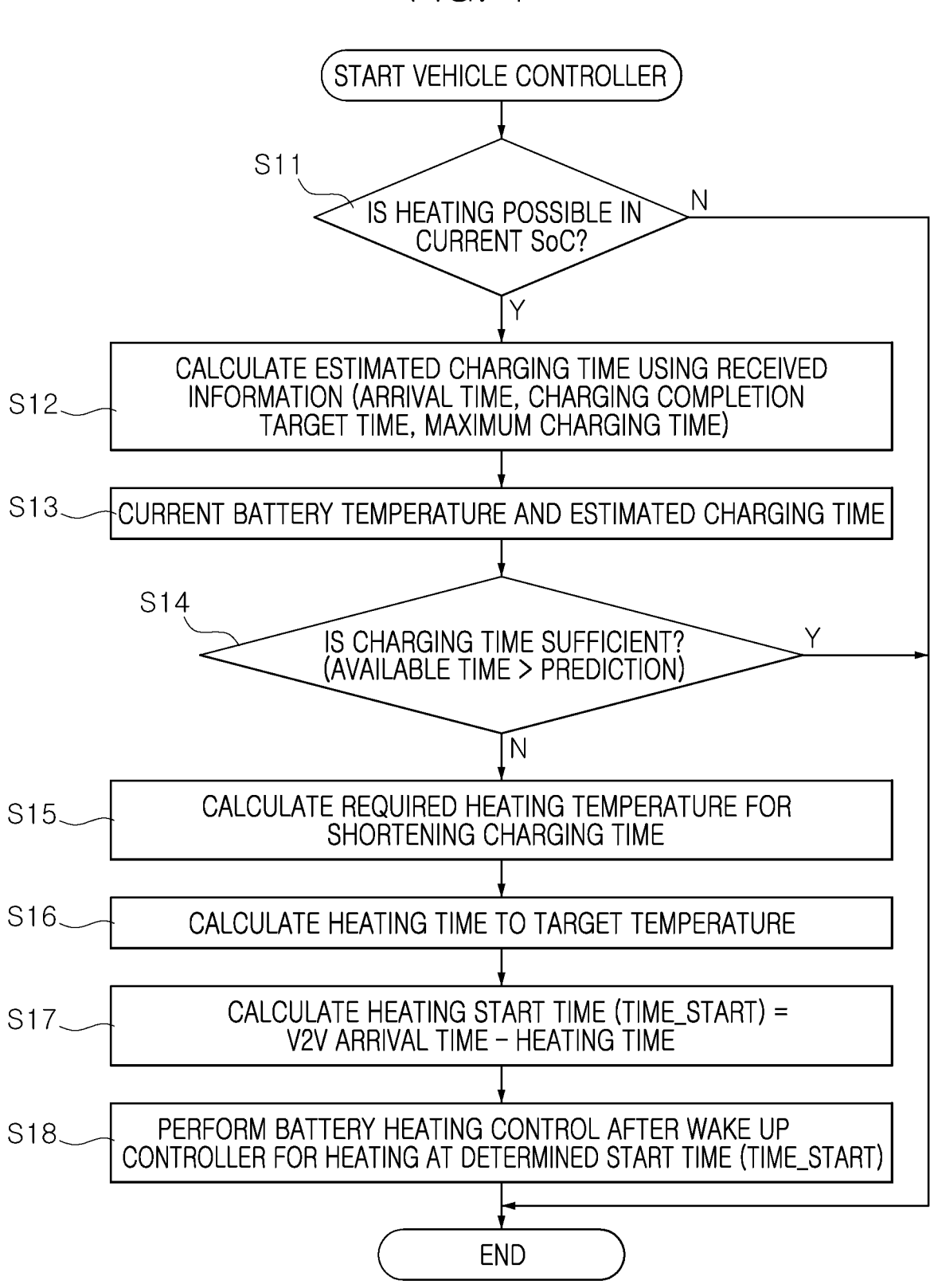
FIG. 4 illustrates a method of controlling a battery temperature for vehicle-to-vehicle charging according to embodiments of the present disclosure.
Figure 5:
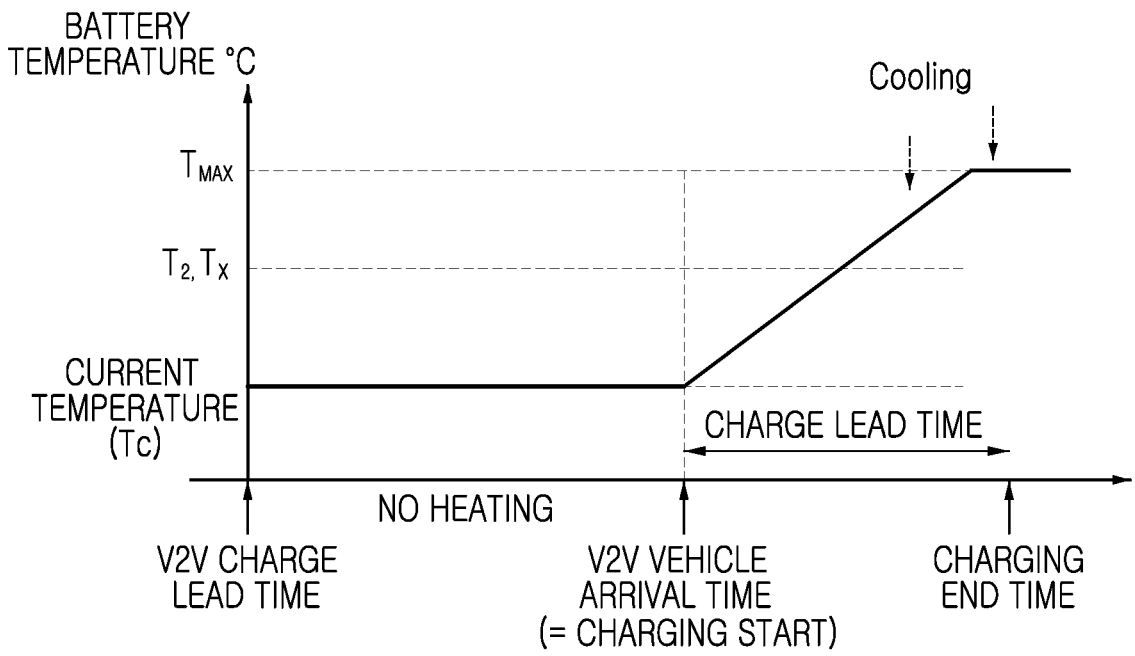
FIGS. 5 and 6 illustrate a battery temperature and a charging time by a system and method for controlling battery temperature according to embodiments of the present disclosure.
Figure 6:
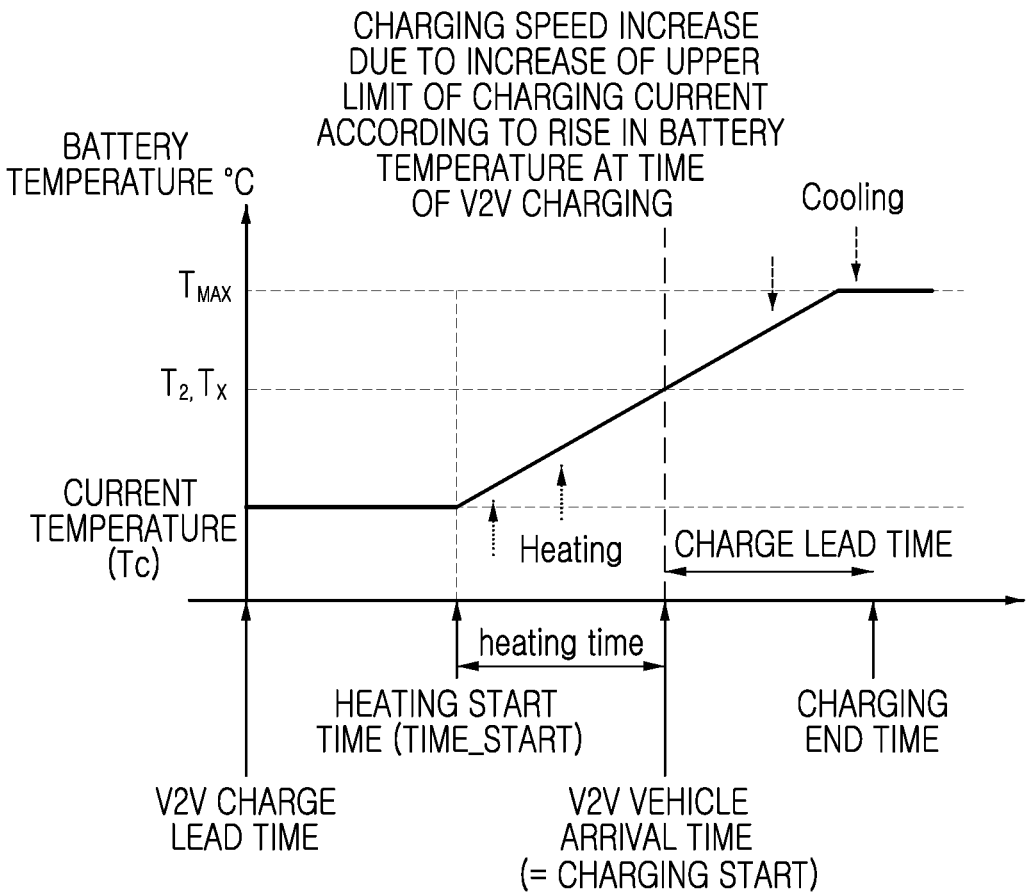

FIG. 4 illustrates a method of controlling a battery temperature for vehicle-to-vehicle charging according to embodiments of the present disclosure. FIGS. 5 and 6 illustrate a battery temperature and a charge lead time according to the system and method for controlling battery temperature of embodiments of the present disclosure.

As described above, when the power receiving electric vehicle receives information on the power transmitting electric vehicle and charging schedule information, a battery temperature for vehicle-to-vehicle charging is controlled as illustrated in FIG. 4.

The vehicle controller 140 determines whether heating is possible in the current SoC using the battery temperature information received from the battery controller 130 (S11), and ends the control thereof when heating is not possible in the current SoC.

In a state in which heating is possible in the current SoC, a charge lead time is calculated based on the received information on the power transmitting electric vehicle and charging schedule information (S12).

The charge lead time is calculated using an arrival time (charging start time), a target time for charging completion, and maximum charging power of the power transmitting electric vehicle.

Then, the estimated charging time is calculated from a current battery temperature received from the battery controller 130 (S13).

Therefore, by comparing the charge lead time and the estimated charging time, it is determined whether the charging time is sufficient (S14), and when a result of the determination is that the charging time is sufficient, the control ends.

FIG. 5 corresponds to the above situation, and heating control is not performed because the charge lead time exceeds the estimated charging time.

As a result of the determination in operation S14, when the charge lead time is shorter than or equal to the estimated charging time, required heating temperature is calculated to shorten the charge lead time (S15).

That is, the battery temperature at which the estimated charging time may be the same as the charge lead time is calculated, and the required heating temperature is calculated to be higher than the calculated battery temperature.

Next, a heating time to reach the required heating temperature is calculated (S16).

When the heating time is calculated, the heating start time is calculated (S17).

Referring to FIG. 6 which shows that the charge lead time is shorter than or equal to the estimated charging time, the heating start time time_start is set by a calculation of an arrival time (charging start time) of a V2V vehicle—a time point of the heating time.

When the heating start time time_start is calculated by the above-described process, the vehicle controller 140 wakes up the battery temperature controller 120 to perform a battery heating control when the heating start time arrives (S18).

Embodiments of the present disclosure can provide a charging infrastructure capable of satisfying both a service provider and a consumer by optimizing a charging speed through the battery temperature control as described above.

While embodiments of the present disclosure have been described with reference to the accompanying drawings, it will be apparent to those skilled in the art that various changes and modifications can be made without departing from the spirit and scope of the present disclosure without limitation to the exemplary embodiments disclosed herein. Accordingly, it should be noted that such alternations or modifications fall within the claims of the present disclosure, and the scope of the present disclosure should be construed on the basis of the appended claims.

What is claimed is:

1. A system for controlling a battery temperature for vehicle-to-vehicle charging, the system comprising:

an info controller provided in a power receiving electric vehicle and configured to receive information on a power transmitting electric vehicle and charging schedule information from a vehicle-to-vehicle charging service server;

a vehicle controller configured to receive the information on the power transmitting electric vehicle and the charging schedule information from the info controller, to receive battery temperature information of the power receiving electric vehicle from a battery controller, and to calculate an estimated charging time of vehicle-to-vehicle charging by the power transmitting electric vehicle; and a battery temperature controller configured to control the battery temperature of the power receiving electric vehicle by controlling operation of a battery heater or a battery chiller, wherein the vehicle controller is configured to control the battery temperature controller in consideration of the estimated charging time.

2. The system of claim 1, wherein the information on the power transmitting electric vehicle and the charging schedule information comprises a charging start time by the power transmitting electric vehicle and maximum charging output information of the power transmitting electric vehicle.

3. The system of claim 2, wherein the vehicle controller is configured to calculate the estimated charging time in consideration of a current state of charge (SoC) of the power receiving electric vehicle.

4. The system of claim 3, wherein the vehicle controller is configured to control the battery temperature controller by comparing the estimated charging time and a charge lead time, wherein the charge lead time is a difference between a charging completion target time requested to the vehicle-to-vehicle charging service server and the charging start time.

5. The system of claim 4, wherein the vehicle controller is configured to control the battery heater to be operated by the battery controller when the estimated charging time exceeds the charge lead time.

6. The system of claim 4, wherein:

the vehicle controller is configured to calculate a required heating temperature for increasing the battery temperature of the power receiving electric vehicle and calculate a heating time taken to reach the required heating temperature when the estimated charging time exceeds the charge lead time; and the required heating temperature is greater than or equal to a difference between the battery temperature at which the estimated charging time and the charge lead time are the same and a current battery temperature.

7. The system of claim 6, wherein the vehicle controller is configured to calculate a heating start time which is a time prior to the heating time from an arrival time of the power transmitting electric vehicle included in the information on the power transmitting electric vehicle.

8. The system of claim 7, wherein the battery controller is configured to control the battery heater to be operated when the heating start time arrives.

9. A method of controlling a battery temperature for vehicle-to-vehicle charging, the method comprising:

receiving, by an info controller provided inside a power receiving electric vehicle, information on a power transmitting electric vehicle and charging schedule information from a vehicle-to-vehicle charging service server;

calculating, by a vehicle controller, a charge lead time of the power receiving electric vehicle after receiving the information on the power transmitting electric vehicle and the charging schedule information from the info controller;

calculating, by the vehicle controller, an estimated charging time after receiving a current battery temperature of the power receiving electric vehicle from a battery controller; and comparing, by the vehicle controller, the charge lead time and the estimated charging time, wherein the battery temperature of the power receiving electric vehicle is controlled by heating when the charge lead time is shorter than or equal to the estimated charging time.

10. The method of claim 9, further comprising:

calculating a required heating temperature for increasing the battery temperature of the power receiving electric vehicle when the charge lead time is shorter than or equal to the estimated charging time; and calculating a heating time to reach the required heating temperature.

11. The method of claim 10, wherein the required heating temperature is greater than or equal to a difference between the battery temperature at which the estimated charging time and the charge lead time are the same and the current battery temperature.

12. The method of claim 10, wherein the charge lead time is calculated using a difference between an arrival time of the power transmitting electric vehicle and a target time of charging completion requested to the vehicle-to-vehicle charging service server based on a maximum charging output of the power transmitting electric vehicle included in the information on the power transmitting electric vehicle.

13. The method of claim 10, further comprising calculating a heating start time after calculating the heating time, wherein the heating start time is calculated using a time prior to the heating time from an arrival time of the power transmitting electric vehicle included in the information on the power transmitting electric vehicle.

14. The method of claim 13, wherein, after calculating the heating start time, the battery temperature of the power receiving electric vehicle is controlled by heating when the heating start time arrives.

15. A power receiving electric vehicle comprising:

an info controller configured to receive information on a power transmitting electric vehicle and charging schedule information from a vehicle-to-vehicle charging service server;

a vehicle controller configured to receive the information on the power transmitting electric vehicle and the charging schedule information from the info controller, receive battery temperature information of the power receiving electric vehicle from a battery controller, and calculate an estimated charging time of vehicle-to-vehicle charging by the power transmitting electric vehicle; and a battery temperature controller configured to control a battery temperature of the power receiving electric vehicle by controlling operation of a battery heater or a battery chiller, wherein the vehicle controller is configured to control the battery temperature controller in consideration of the estimated charging time.

16. The power receiving electric vehicle of claim 15, wherein the information on the power transmitting electric vehicle and the charging schedule information comprises a charging start time by the power transmitting electric vehicle and maximum charging output information of the power transmitting electric vehicle.

17. The power receiving electric vehicle of claim 16, wherein the vehicle controller is configured to control the battery temperature controller by comparing the estimated charging time and a charge lead time, wherein the charge lead time is a difference between a charging completion target time requested to the vehicle-to-vehicle charging service server and the charging start time.

18. The power receiving electric vehicle of claim 17, wherein the vehicle controller is configured to control the battery heater to be operated by the battery controller when the estimated charging time exceeds the charge lead time.

19. The power receiving electric vehicle of claim 17, wherein:

the vehicle controller is configured to calculate a required heating temperature for increasing the battery temperature of the power receiving electric vehicle and calculate a heating time to reach the required heating temperature when the estimated charging time exceeds the charge lead time; and the required heating temperature is greater than or equal to a difference between the battery temperature at which the estimated charging time and the charge lead time are the same and a current battery temperature.

20. The power receiving electric vehicle of claim 19, wherein:

the vehicle controller is configured to calculate a heating start time which is a time prior to the heating time from an arrival time of the power transmitting electric vehicle included in the information on the power transmitting electric vehicle; and the battery controller is configured to control the battery heater to be operated when the heating start time arrives.

\* \* \* \* \*